United States Patent
Yoneda et al.

(10) Patent No.: US 8,053,533 B2
(45) Date of Patent: Nov. 8, 2011

(54) PHENOLIC OH-CONTAINING POLYIMIDE SILICONE, EPOXY RESIN AND CURING AGENT

(75) Inventors: Yoshinori Yoneda, Annaka (JP); Michihiro Sugo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/547,647

(22) Filed: Aug. 26, 2009

(65) Prior Publication Data

US 2010/0056730 A1    Mar. 4, 2010

(30) Foreign Application Priority Data

Aug. 27, 2008 (JP) ................. 2008-218318

(51) Int. Cl.
*C08L 63/00* (2006.01)
*C08L 63/02* (2006.01)
*C08L 63/04* (2006.01)

(52) U.S. Cl. ........ 525/423; 525/107; 525/109; 525/111; 525/113; 525/114

(58) Field of Classification Search .......................... None
See application file for complete search history.

(56) References Cited

U.S. PATENT DOCUMENTS

| | | | |
|---|---|---|---|
| 5,643,986 A | 7/1997 | Ishikawa et al. | |
| 6,706,841 B2 | 3/2004 | Sugo et al. | |
| 7,432,313 B2 | 10/2008 | Yoneda et al. | |
| 2004/0019174 A1 | 1/2004 | Ichiroku et al. | |
| 2006/0084714 A1 | 4/2006 | Yoneda et al. | |
| 2009/0062479 A1 | 3/2009 | Yoneda et al. | |

FOREIGN PATENT DOCUMENTS

| | | | |
|---|---|---|---|
| EP | 1246280 A2 | | 10/2002 |
| EP | 2033984 A2 | | 3/2009 |
| EP | 2033985 A2 | | 3/2009 |
| JP | 2002-332605 A | | 11/2002 |
| JP | 2004-149777 A | | 5/2004 |
| JP | 2005-113059 A | | 4/2005 |
| JP | 2005-120270 A | * | 5/2005 |
| JP | 2006-104447 A | | 4/2006 |
| JP | 2008-138124 A | * | 6/2008 |
| JP | 2009-62435 A | | 3/2009 |

OTHER PUBLICATIONS

Japanese Patent No. 2005-113059, Sugao et al., Apr. 28, 2005, translation, 27 pages.*

* cited by examiner

*Primary Examiner* — Robert Sellers
(74) *Attorney, Agent, or Firm* — Birch, Stewart, Kolasch & Birch, LLP

(57) ABSTRACT

A solvent-free polyimide silicone resin composition, and a cured product thereof, includes (A) a polyimide silicone resin having recurring units having a specific type of structure and having a weight average molecular weight of 5,000 to 150,000, (B) an epoxy resin, and (C) an epoxy resin curing agent wherein the resin composition having a fluidity at 25° C. and is free of a solvent.

12 Claims, No Drawings

PHENOLIC OH-CONTAINING POLYIMIDE SILICONE, EPOXY RESIN AND CURING AGENT

CROSS-REFERENCE TO RELATED APPLICATION

This non-provisional application claims priority under 35 U.S.C. §119(a) on Patent Application No. 2008-218318 filed in Japan on Aug. 27, 2008, the entire contents of which are hereby incorporated by reference.

TECHNICAL FIELD

This invention relates to a solvent-free or solventless polyimide silicone resin composition which is useful in the fields of protective films, insulating films, adhesives and the like of electric and electronic parts and semiconductor materials and is particularly excellent in adhesion reliability and useful in applications where no solvent can be used. The invention also relates to a cured product of such a composition as mentioned above.

BACKGROUND ART

Since polyimide resins are excellent in various characteristic properties such as mechanical strength, adhesiveness, solvent resistance, low-temperature resistance, heat resistance, flame retardance, electric insulating property and the like and have been in wide use for electric and electronic parts. Especially, the resins have been widely utilized as insulating films, protective films and flexible printed circuit boards of semiconductors, and substrates of heat-resistance adhesive tapes.

Where polyimide resins are employed as a resin varnish, the polyimide resin is dissolved in an organic solvent and the resulting solution is applied onto a substrate or the like and thermally treated to remove the solvent for curing. Alternatively, a polyamic acid that is a precursor of a polyamide resin may be dissolved in an organic solvent and coated onto a substrate or the like, and is thermally treated to remove the organic solvent and simultaneously to permit the imidization reaction to proceed for curing. In either case, the organic solvent has to be evaporated during operations and thus, local exhaust equipment or the like is essential. Additionally, there are concerns about environmental burdens. On the other hand, where a polyimide resin is used as a film, no organic solvent is needed and thus, no provision such as of local exhaust equipment is necessary, with no concerns about environmental burdens. In this connection, however, such a film has the problem in that there is no degree of freedom over thickness in use and the film is unsuited for applications that require fluidity.

In case where it is desirable to use polyimide resins in the form of a coating liquid without use of solvents, there are required techniques of dilution with reactive diluents.

For instance, JP-A 2002-332305 and JP-A 2006-104447 set forth the use of an acrylic monomer as a reactive diluent in such techniques as mentioned above, which involves the problem in that the acrylic monomer is low in heat resistance, with the tendency to impede the physical properties of polyimide resins.

By the way, epoxy resins can be provided in a variety of forms including from liquid to tablet and cured products thereof are excellent in characteristic properties such as electric characteristics, heat resistance, adhesiveness, moisture proofing (water proofing) and the like. Hence, the epoxy resins have been widely used in the fields of electric and electronic parts, structural materials, adhesives, paints and the like. In recent years, however, adhesion reliability required for electronic materials have been very severe, for which the use of epoxy resins may not be always satisfactory. In such a case, the use of such polyimide resins as set out above can solve the above problem in many cases. Nevertheless, a current situation is such that there is no proper material or composition for use in applications satisfying solvent-free and liquid requirements.

SUMMARY OF THE INVENTION

It is accordingly an object of the invention to provide a solvent-free polyimide silicone resin composition which overcomes the problems involved in the prior art techniques.

It is another object of the invention to provide a solvent-free polyimide silicone resin composition and a cured product thereof, which are useful as a protective film, an insulating film, an adhesive and the like of electrical and electronic parts or semiconductor materials, and which are particularly excellent in adhesion reliability and are useful in applications where no solvent can be used.

In order to achieve the above objects, there is provided, in a broad sense, a solvent-free polyimide silicone resin composition, and a cured product thereof, which includes (A) a polyimide silicone resin having recurring units having a specific type of structure and a weight average molecular weight of 5,000 to 150,000, (B) an epoxy resin, and (C) an epoxy resin curing agent, the resin composition having a fluidity at 25° C. and being free of a solvent.

The composition and a cured product thereof are useful in applications as a protective film, an insulating film, an adhesive or the like of electric and electronic parts and semiconductor materials and, in particularly, are excellent in adhesion reliability and useful in applications where no organic solvent can be used.

More particularly, according to the invention, there is provided a solvent-free polyimide silicone resin composition, which includes: (A) a polyimide silicone resin having recurring units represented by the following formula (1) and a weight average molecular weight of 5,000 to 150,000; (B) an epoxy resin; and (C) an epoxy resin curing agent, the resin composition having a fluidity at 25° C. and being free of a solvent

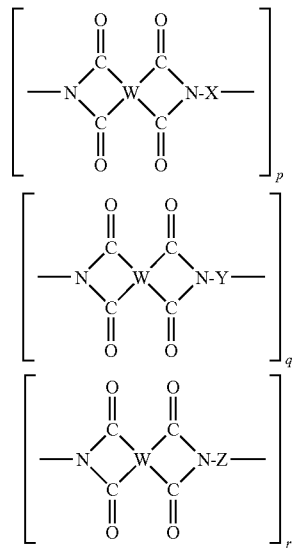

wherein W represents a tetravalent organic group, X represents a divalent group having a phenolic hydroxyl group, Y represents a divalent silicone residue represented by the following formula (2), Z represents a divalent organic group other than X and Y, and p, q and r are such that $0.15 \leq p \leq 0.6$, $0.05 \leq q \leq 0.8$ and $0 \leq r \leq 0.75$ are satisfied provided that the total of p, q and r is at 1.

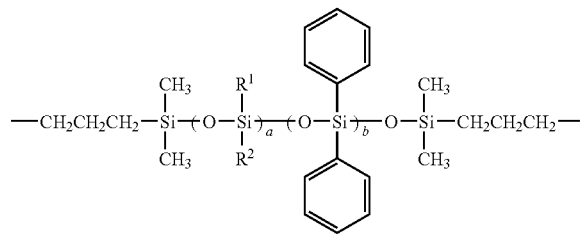

(2)

wherein $R^1$ and $R^2$ may be the same or different and represent an alkyl group having 1 to 6 carbon atoms, and a and b are, respectively, an integer of 1 to 20 provided that $1 \leq a+b \leq 20$ and $0.1 \leq b/(a+b+2) \leq 0.5$.

The epoxy resin (B) preferably contains a liquid epoxy resin.

It is preferred that the epoxy resin curing agent (C) includes as its main component a liquid acid anhydride, a liquid amine compound or a liquid phenol resin.

In the resin composition of the invention, the content of the polyimide silicone resin (A) relative to the total of the polyimide silicone resin (A), the epoxy resin (B) and the epoxy resin curing agent (C) ranges from 1 to 30 wt %.

In the practice of the invention, it is preferred that the solvent-free polyimide silicone resin composition has a viscosity of not greater than 10,000 Pa-second at 25° C.

In the above formula (1), X is preferably a divalent group having a phenolic hydroxyl group represented by any of the following formulas (3) to (8).

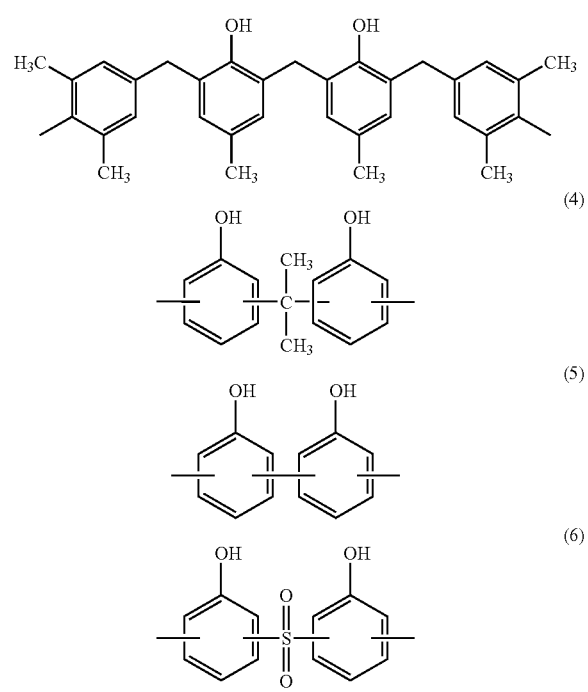

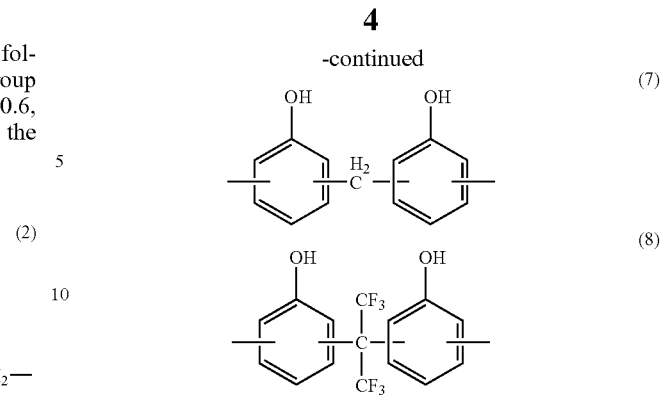

In accordance with the invention, there is also provided a thermally cured product of the solvent-free polyimide silicon resin composition defined above.

ADVANTAGEOUS EFFECT OF INVENTION

This invention provides a solvent-free or solventless polyimide silicone resin composition which is useful in the fields of protective films, insulating films, adhesives and the like of electric and electronic parts and semiconductor materials and is particularly excellent in adhesion reliability and useful in applications where no solvent can be used.

DETAILED DESCRIPTION OF THE PREFERRED EMBODIMENTS

The invention is now described in detail.

The solvent-free polyimide silicone resin composition of the invention includes, at least, (A) a polyimide silicone resin, (B) an epoxy resin, and (C) an epoxy resin curing agent.

[(A) Polyimide Silicone Resin]

The polyimide silicone resin is initially illustrated.

The polyimide silicone resin has recurring units represented by the following general formula (1).

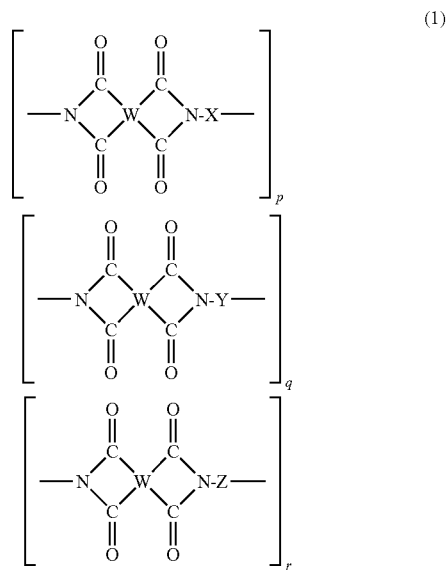

(1)

Specific examples of the divalent group represented by W in the formula (1) include the residues of pyromellitic dianhydride, 2,3,3',4'-biphenyltetracarboxylic dianhydride, 3,3',4,4'-biphenyltetracarboxylic dianhydride, 3,3',4,4'-diphenyl ether tetracarboxylic dianhydride, 3,3',4,4'-diphenyl sulfone tetracarboxylic dianhydride, 3,3',4,4'-dibenzophenonetetracarboxylic dianhydride, ethylene glycol bistrimellitic dianhydride, 3,3',4,4'-diphenyl ether tetracarboxylic dianhydride, 4,4'-hexafluoropropylidene bisphthalic dianhydride, 2,2-bis[4-(3,4-phenoxydicarboxyic acid)phenyl]propanoic dianhydride and the like.

Of these, the residues of 3,3',4,4'-diphenyl sulfone tetracarboxylic dianhydride, 4,4'-hexafluoropropylidene bisphthalic dianhydride, and 2,2-bis[4-(3,4-phenoxydicarboxyic acid)phenyl]propanoic dianhydride are preferred because they are excellent in miscibility with an epoxy resin and an epoxy resin curing agent and also in fluidity after the miscible mixing as will be described hereinafter.

X in the formula (1) represents a diamine residue having a functional group reactive with an epoxy resin described later and is preferably a diamine residue having a phenolic hydroxyl group. More preferably, mention is made of residues of divalent diamines having a phenolic hydroxyl group represented by the following formulas (3) to (8).

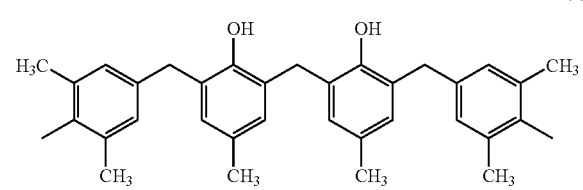
(3)

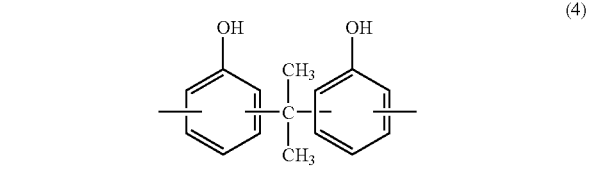
(4)

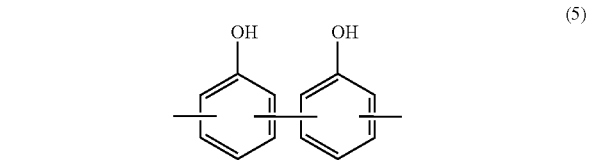
(5)

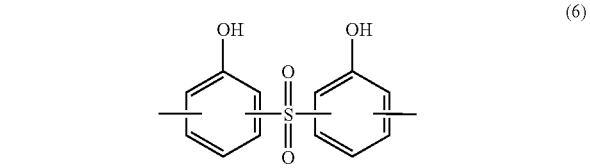
(6)

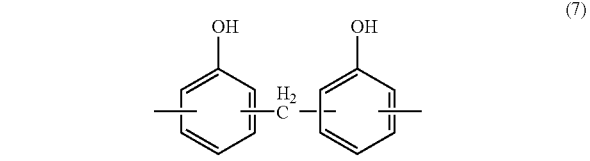
(7)

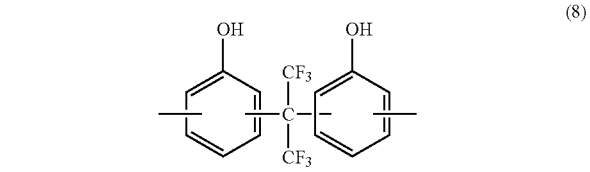
(8)

These phenolic hydroxyl group contributes to thermal curing with an epoxy resin, thereby obtaining a cured product of good quality according to the invention.

In order that the composition of the invention exhibits good adhesiveness and ensures good miscibility with an epoxy resin and an epoxy resin curing agent described hereinafter and good fluidity after the miscible mixing, a residue of a diaminosiloxane represented by the following formula (2) is mentioned as Y in the formula (1).

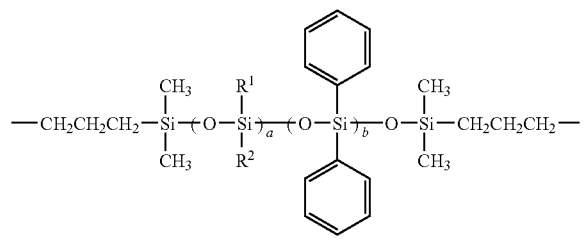
(2)

$R^1$ and $R^2$ in the formula (2) may be the same or different and represent an alkyl group having 1 to 6 carbon atoms, and a and b are, respectively, an integer of 1 to 20 provided that $1 \leq a+b \leq 20$. If a and b are, respectively, outside the above range, miscibility of a polyimide silicone resin with an epoxy resin and an epoxy resin curing agent becomes worsened and thus, desired physical properties such as adhesiveness, heat resistance, strength and the like cannot be obtained. Moreover, $0.1 \leq b/(a+b+2) \leq 0.5$ should be satisfied. If the value of $b/(a+b+2)$ is less than 0.1, miscibility of a polyimide silicone resin with an epoxy resin and an epoxy resin curing agent becomes worsened and no desired physical properties such as adhesiveness, heat resistance, strength and the like can be obtained, with some case where no miscibility is attained. On the other hand, when the value of $b/(a+b+2)$ is larger than 0.5, actual preparation of a diaminosiloxane is difficult.

Z in the formula (1) represents a divalent group other than those of X and Y and is a group derived from a diamine used in existing polyimide resins. As the diamine, mention is made of aliphatic diamines such as tetramethylenediamine, 1,4-diaminocyclohexane, 4,4'-diaminodicyclohexylmethane and the like, and aromatic diamines such as phenylenediamine, 4,4'-diaminodiphenyl ether, 2,2-bis(4-aminophenyl)propane and the like. These diamines may be used in combination. Of these, the aromatic diamine represented by the following formula (14) is preferable. Also the formula (14) wherein B represents a group of the following formulas (15), (16) or (17).

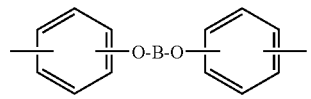
(14)

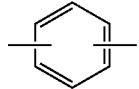
(15)

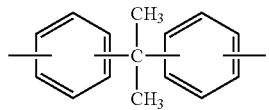
(16)

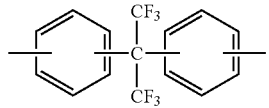
(17)

In order to permit the effects based on the respective ingredients to be properly developed, p, q and r in the formula (1) are such that $0.15 \leq p \leq 0.6$, $0.05 \leq q \leq 0.8$ and $0 \leq r \leq 0.75$, preferably $0.2 \leq p \leq 0.5$, $0.05 \leq q \leq 0.75$ and $0 \leq r \leq 0.6$.

The weight average molecular weight of the polyimide silicone resin ranges from 5,000 to 150,000, preferably from 20,000 to 150,000. If the molecular weight is smaller than 5,000, toughness of the resin does not develop. The molecular weight larger than 150,000 causes unlikelihood of being miscible with an epoxy resin and an epoxy resin curing agent described later. In addition, the viscosity after miscible mixing becomes too high, resulting in poor workability.

Such a polyimide silicone resin can be prepared according to a known technique.

Initially, a tetracarboxylic dianhydride for deriving W in the formula (1), a diamine used to derive X, Z and a diaminopolysiloxane used to derive Y are charged into a solvent and reacted at a low temperature of about 20 to 50° C. to prepare a polyamic acid that is a precursor of polyimide resin. Next, the resulting polyamic acid solution is heated preferably to a temperature of 80 to 200° C., more preferably to 140 to 180° C., so that the acid amide of the polyamic acid is subjected to dehydration ring-closing reaction to obtain a solution of a polyimide silicone resin. This solution is charged into a solvent such as of water, methanol, ethanol or acetonitrile to allow precipitation. The precipitate is dried to obtain a polyimide silicone resin.

The total amount of the diamine and diaminopolysiloxane relative to the tetracarboxylic dianhydride ranges preferably from 0.95 to 1.05, more preferably from 0.98 to 1.02 by molar ratio. The solvents used for the preparation of the polyimide silicone resin include N-methyl-2-pyrrolidone, cyclohexanone, γ-butyrolactone, N,N-dimethylacetamide and the like. Combinations with aromatic hydrocarbons such as toluene, xylene and the like ensure the possible likelihood of removing water formed during the imidization through azeotropy. These solvents may be used singly or in combination of two or more.

It will be noted that in order to control the molecular weight of the polyimide silicone resin, monofunctional starting materials such as phthalic anhydride, aniline and the like may be added. In this case, the amount is preferably not larger than 2 mole % relative to the polyimide silicone resin.

There may be used a process wherein imidization is carried out by adding a dehydrator and an imidization catalyst in the course of the imidization step and heating to about 50° C. In this process, the dehydrator used includes, for example, acid anhydrides such as acetic anhydride, propionic anhydride, trifluoroacetic anhydride and the like. The amount of the dehydrator is preferably in the range of 1 to 10 moles per mole of the diamine. The imidization catalysts include, for example, ternary amines such as pyridine, collidine, lutidine, triethylamine and the like. The amount of the imidization catalyst is preferably in the range of 0.5 to 10 moles per mole of the dehydrator used.

Even where at least one of the diamine and tetracarboxylic dianhydride is used in plurality, no limitation is placed on the reaction process. For instance, there are mentioned a process wherein all starting materials are mixed together beforehand, followed by subsequent co-polycondensation, a process wherein two or more diamines or tetracarboxylic dianhydrides are successively added while reacting individually, and the like.

[(B) Epoxy Resin]

Epoxy resins are now described.

The epoxy resins are preferably of the types wherein precursors are made of compounds such as phenols, amines, carboxylic acids, intramolecular unsaturated carbon and the like compounds.

As a glycidyl ether-based epoxy resin making use of a phenol as a precursor, mention is made of a bisphenol A epoxy resin, a bisphenol F epoxy resin, a bisphenol S epoxy resin, an epoxy resin having a biphenyl skeleton, a phenolnovolac epoxy resin, a cresol-novolac epoxy resin, a resorcinol epoxy resin, an epoxy resin having a naphthalene skeleton, a triphenylmethane epoxy resin, a phenolaralkyl epoxy resin, a dicylopentadiene epoxy resin, a diphenylfluorene epoxy resin, and various types of isomers and alkyl or halogen-substituted products thereof. Additionally, epoxy resins making use of phenol as a precursor modified with urethanes or isocyanates, and dimer acid-modified bisphenol A epoxy resins may also be used.

As a glycidylamine-based epoxy resin making use of an amine as a precursor, mention is made of various types of positional isomers and alkyl group or halogen-substituted compounds of glycidyl compounds such as tetraglycidyldiamiodiphenylmethane and xylenediamine, triglycidylaminophenol, and glycidylaniline.

As an epoxy resin making use of a carboxylic acid as a precursor, mention is made of various types of isomers of a glycidyl compound of phthalic acid, and glycidyl compounds of hexahydrophthalic acid and a dimer acid.

As an epoxy resin making use of intramolecular unsaturated carbon as a precursor, mention is made of an alicyclic epoxy resin.

Further, a monofunctional epoxy resin containing one epoxy group in the molecule may be added, if necessary. For the purpose of improving adhesion with a substrate, carbon-functional silanes may be added.

Such epoxy resins exhibit good miscibility with the polyimide silicone resin and an epoxy resin curing agent.

To ensure appropriate fluidity after miscible mixing, the epoxy resin ingredient should preferably have fluidity and more preferably have a viscosity of not greater than 300 Pa-second at 25° C.

More particularly, a liquid epoxy resin alone may be used, or an appropriate mixture of a solid epoxy resin and a liquid epoxy resin may be used.

In case where a solid epoxy resin and a liquid epoxy resin are mixed, the solid epoxy resin is generally formulated in an amount of 1 to 200 parts by weight, preferably 5 to 100 parts by weight, per 100 parts by weight of the liquid epoxy resin although depending on the shape and size of the solid epoxy resin. If the amount is less than 1 part by weight, there is concern that no effect of the formulation of the solid epoxy resin may develop, over 200 parts by weight, there is also concern that an appropriate degree of fluidity is not obtained.

[(C) Epoxy Resin Curing Agent]

Next, epoxy resin curing agents are described.

Any of epoxy resin curing agents which are used for curing epoxy resins may be usable without limitation. More specifically, there are mentioned aliphatic amines, alicyclic amines, aromatic amines, aminobenzoic acid esters, polyaminoamide resins, acid anhydrides, phenolic resins, dicyanediamides, mecaptan compounds, imidazole compounds, Lewis acid complexes, urea resins, isocyanates and the like. These may be used singly or in combination of two or more. Of these, where those that react with an epoxy group are used, it is preferable to formulate them in amounts of 0.6 to 1.4 equivalents relative to the active hydrogen equivalent of the total epoxy groups. When using a catalyst such as of an imidazole compound, a tertiary amine or the like, an appropriate amount necessary for curing, more particularly, an amount of 0.5 to 20 parts by weight thereof is added per 100 parts by weight of the epoxy resin.

Specific examples of the epoxy resin curing agent reacting with an epoxy group include aliphatic amine curing agents including linear aliphatic diamines such as ethylenediamine, trimethylenediamine, tetramethylenediamine, hexamethylenediamine and the like, diamines such as polyether diamines, substituted 1,2-diamines, branched polymethylenediamines and the like, linear aliphatic polyvalent amines such as diethylenetriamine, triethylenetetramine, tetramethylenepentamine and the like, and polyvalent amines such as aminoethylethanolamine, dimethylaminopropylamine and the like, alicyclic amine curing agents such as menthenediamine, isophorone diamine, bis(4-amino-3-methylcyclohexyl)methane, diaminodicyclohexylmethane, 4,4'-diaminobicylohexylmethane and the like, aromatic amine curing agents such as meta-phenylenediamine, para-phenylenediamine, meta-xylylenediamine, para-xylylenediamine, 4,4'-dianinodiphenylmethane, 1,3-bis(4-aminophenyl)propane, 4,4'-diaminodipehnyl ether, 4,4'-diaminodiphenylsulfone, bis(4-aminophenyl)methane, 1,5-diaminonaphthalene, 1,1-bis-(4-aminophenyl)cyclohexane and the like, acid anhydride curing agents including aliphatic acid anhydrides such as dodecenyl succinic anhydride, polyadipic anhydride and the like, alicyclic acid anhydrides such as hexahydrophthalic anhydride, methylhexahydrophthalic anhydride, methylcyclohexenedicarboxylic anhydride, hydrogenated nadic anhydride, hydrogenated methylnadic anhydride and the like, and aromatic acid anhydrides such as phthalic anhydride, trimellitic anhydride, pyromellitic anhydride, benzophenonetetracarboxylic anhydride and the like. The phenolic resins include resol phenolic resins such as aniline-modified resol resins, dimethyl ether resol resins and the like, novolac phenolic resins such as phenol novolac resins, cresol novolac resins, tert-butylphenol novolac resins, nonylphenol novolac resins and the like, and phenolic resins such as phenol aralkyl resins and the like.

Of these epoxy resin curing agents, especially acid anhydride compounds, amine compounds and phenolic resins are preferred. Such epoxy resin curing agents exhibit good miscibility with the polyimide silicone resin and epoxy resin.

The epoxy resin curing agent should preferably have fluidity and more preferably have a viscosity of not greater than 300 Pa-second at 25° C. Especially, the agent is preferably made mainly of a liquid acid anhydride compound, a liquid amine compound or a liquid phenolic resin.

More particularly, a liquid epoxy resin curing agent alone may be used, or a mixture obtained by appropriately mixing a solid epoxy resin curing agent and a liquid epoxy resin curing agent together may be used. Moreover, an epoxy resin curing catalyst may be added as will be described hereinafter.

Where a solid epoxy resin curing agent and a liquid epoxy resin curing agent are mixed, the solid epoxy resin curing agent is generally formulated in an amount of 1 to 100 parts by weight, preferably 5 to 50 parts by weight, per 100 parts by the liquid epoxy resin curing agent although depending on the shape and size of the solid epoxy resin curing agent. If the amount is less than 1 part by weight, there is concern that no effect of formulating the solid curing agent develops. If the amount exceeds 100 parts by weight, an appropriate degree of fluidity is not attained unfavorably.

[Content of Polyimide Silicone Resin]

The content of the polyimide silicone resin relative to the total of the polyimide silicone resin, epoxy resin and epoxy resin curing agent preferably ranges from 1 to 30 wt %, more preferably 5 to 30 wt %. If the content is less than 1 wt %, there is concern that the resin composition does not take advantage of the feature of the polyimide. If the content exceeds 30 wt %, there is concern that a difficulty is unfavorably involved in keeping an appropriate fluidity at 25° C., more specifically keeping a viscosity at 25° C. in ranges of not greater than 10,000 Pa-second.

[Epoxy Resin Curing Catalyst]

The solvent-free polyimide silicone resin composition of the invention may be formulated with an epoxy resin curing catalyst, which reacts with an epoxy resin or assists the mutual reaction of epoxy groups.

The use of tertiary amines as an epoxy resin curing catalyst is effective for curing systems making use of acid anhydrides, mercaptans, polyamide-amines and the like. The use of imidazole compounds is effective for curing systems making use of acid anhydrides, phenol-novolac resins, dicyandiamide and the like. Examples of the tertiary amine include triethylamine, benzyldimethylamine, pyridine, picoline, 1,8-diazabiscyclo(5,4,0)undecene-1 and the like. Examples of the imidazole compound include 2-methylimidazole, 2-ethylimidazole, 2-undecylimidazole, 2-ethyl-4-methylimidazole, 2-phenyl-4,5-dihydroxymethylimidazole and the like.

The amount of the curing catalyst may be one which is effective for use as a catalyst and is generally in the range of 0.5 to 20 parts by weight, preferably 1 to 10 parts by weight, per 100 parts by weight of the epoxy resin. If the amount is less than 0.5 parts by weight, there is concern that no function as a catalyst develops. The amount exceeding 20 parts by weight is unfavorable because there is concern that storage stability and workability become worsened.

[Other Additives]

The solvent-free polyimide silicone resin composition may be further admixed, aside from the above-stated ingredients, with additives such as thermally conductive fillers, antiaging agents, ultraviolet absorbers, adhesion improvers, flame retardants, surfactants, storage stabilizers, ozone inhibitors, optical stabilizers, thickeners, plasticizers, silane coupling agents, antioxidants, heat stabilizers, conductivity-imparting agents, antistatic agents, radiation interceptors, nucleating agents, lubricants, pigments, metal inactivators, physical property-adjusting agents and the like within ranges not impeding the purposes and effects of the invention. More specifically, mention is made of inorganic matters such as particulate alumina, particulate silica, fumed silica, silicon carbide, diamond, clay, boron nitride, aluminium nitride, titanium dioxide, dicalcium phosphate, fumed metal oxides and the like, and organic matters such as polyaniline, polythiophene, polypyrrole, polyphenylene vinylene, polydialkylfluorenes, carbon black, graphite and the like. The amount of the additives is generally in the range of 0.1 to 400 parts by weight, preferably 1 to 300 parts by weight, per 100 arts by weight of the epoxy resin.

[Coating and Curing Methods]

The coating techniques of the solvent-free polyimide silicone resin composition may be those coating techniques ordinarily employed for such a solvent-free polyimide silicon resin composition and including, for example, a brushing technique, a spray coating technique, a wire bar technique, a blade technique, a roll coating technique, a dipping technique and the like. Using these techniques, arbitrary substrates and parts can be coated with the resin composition.

The resin composition can be cured at a temperature of 150 to 200° C. for about 1 to 10 hours, thereby obtaining a cured product whose adhesion reliability is excellent.

EXAMPLES

Examples are shown to particularly illustrate the invention, which should not be construed as limiting the invention thereto. Comparative Examples are also shown.

Initially, compounds used are indicated below along with abbreviations thereof.

(1) Acid Dianhydrides
BPADA: 2,2-bis[4(3,4-dicarboxyphenoxy)phenyl]propane dianhydride (commercial name of Aldrich Co.)
DSDA: 3,3',4,4'-diphenyl sulfone tetracarboxylic dianhydride (commercial name of New Japan Chemical Co., Ltd.)
6FDA: 2,2-bis(3,4-benzenedicarboxyic acid anhydride) hexa-fluoropropane (commercial name of Daikin Industries, Ltd.)

(2) Phenolic Hydroxyl Group-Containing Diamino Compounds
HAB: 3,3'-dihydroxy-4,4'-diaminobiphenyl (commercial name of Wakayama Seika Corporation)

6FAP: 2,2'-bis(3-amino-4-hydroxyphenyl)hexafluoropropane (commercial name of Aldrich Co.)

(3) Diaminosiloxane Compounds

PSI-A: diaminosiloxane represented by the following formula (18)

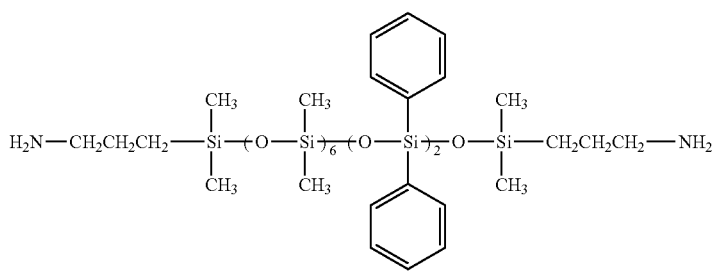

(18)

PSI-B: diaminosiloxane represented by the following formula (19)

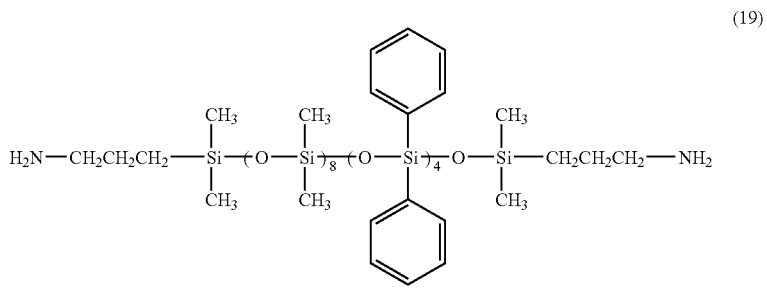

(19)

PSI-C: diaminosiloxane represented by the following formula (20)

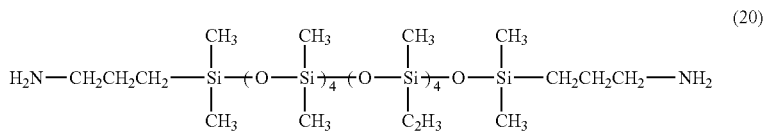

(20)

PSI-D: diaminosiloxane represented by the following formula (21)

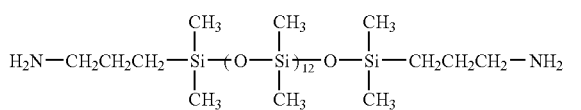

(21)

(4) Other Diamine Compounds

BAPP: 2,2-bis([4-(4-aminophenoxy)phenyl]propane (commercial name of Wakayama Seika Corporation)

APB: 1,3-bis-(3-aminophenoxy)benzene (commercial name of Mitsui Chemicals Inc.)

(5) Solvent

NMP: N-methyl-2-pyrrolidone (commercial name of Hayashi Pure Chemical Ind., Ltd.)

(6) Epoxy Resins

EP-A: bisphenol A epoxy resin 188 g/mol (12.4 Pa-second at 25° C., commercial name of DER331, made by The Dow Chemical Co.)

EP-B: orthocresol novolac epoxy resin 199 g/mol (solid at room temperature, EOCN-1020, made by Nippon Kayaku Co., Ltd.)

EP-C: naphthalene epoxy resin 230 g/mol (solid at room temperature, NC-7000L, made by Nippon Kayaku Co., Ltd.)

(7) Phenolic Resins

PH-A: liquid phenol novolac resin 135 g/mol (commercial name of MEH8005, made by Meiwa Plastic Industries, Ltd., 6.5 Pa-second)

PH-B: phenol novolac resin 105 g/mol (solid at room temperature, commercial name of DL-92, made by Meiwa Plastic Industries, Ltd.)

(8) Other Resin

EA: ethyl acrylate (commercial name of Aldrich Co.)

(9) Epoxy Resin Curing Agent

IMZ: 2-Ethyl-4-methylimidazole (2E4MZ, made by Shikoku Chemicals Corporation)

(10) Other Curing Catalyst

D1173: 2-Hydroxy-2-methyl-1-phenylpropan-1-on (DAROCUR 1173, made by Ciba Specialty Chemicals Co.)

[Synthesis of Polyimide Silicone Resins]

Next, synthesis of polyimide silicone resins is described in Synthetic Examples 1 to 9. The summary of the synthetic examples is shown in Table 1.

Synthetic Example 1

44.4 g (0.1 mol) of 6FDA and 400 g of NMP were charged into a flask equipped with an agitator, a thermometer and a nitrogen-purging device. Thereafter, a solution of 8.6 g (0.04 mols) of HAB and 65.3 g (0.06 mols) of PSI-A represented by the foregoing formula (18) dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (a).

The resin was subjected to measurement of infrared ray absorption spectra, revealing no appearance of the absorption based on an unreacted polyamic acid and confirming absorptions based on the imide group at $1,780 \text{ cm}^{-1}$ and $1,720 \text{ cm}^{-1}$. When the weight average molecular weight (in polystyrene conversion) was measured according to gel permeation chromatography (GPC) using a tetrahydrofuran solvent, it was at 33,000. The content of silicon measured by an ashing method was at 14.2 wt % and the content of the diphenylsiloxane in the siloxane measured by $^{29}$Si-NMR was at 20 mol %.

Synthetic Example 2

44.4 g (0.1 mol) of 6FDA and 400 g of NMP were charged into a flask equipped with an agitator, a thermometer and a nitrogen-purging device. Thereafter, a solution of 4.3 g (0.02 mols) of HAB, 98.0 g (0.06 mols) of PSI-A represented by the foregoing formula (18) and 8.2 g (0.02 mols) of BAPP dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (b).

The resin was subjected to measurement of infrared ray absorption spectra, revealing no appearance of the absorption based on an unreacted polyamic acid and confirming absorptions based on the imide group at $1,780 \text{ cm}^{-1}$ and $1,720 \text{ cm}^{-1}$. When the weight average molecular weight (in polystyrene conversion) was measured according to gel permeation chromatography (GPC) using a tetrahydrofuran solvent, it was at 35,000. The content of silicon measured by an ashing method was at 13.7 wt % and the content of the diphenylsiloxane in the siloxane measured by $^{29}$Si-NMR was at 20 mol %.

Synthetic Example 3

44.4 g (0.1 mol) of 6FDA and 400 g of NMP were charged into a flask equipped with an agitator, a thermometer and a nitrogen-purging device. Thereafter, a solution of 8.6 g (0.04 mols) of HAB and 98.0 g (0.06 mols) of PSI-B represented by the foregoing formula (19) dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (c).

The resin was subjected to measurement of infrared ray absorption spectra, revealing no appearance of the absorption based on an unreacted polyamic acid and confirming absorptions based on the imide group at $1,780 \text{ cm}^{-1}$ and $1,720 \text{ cm}^{-1}$. When the weight average molecular weight (in polystyrene conversion) was measured according to gel permeation chromatography (GPC) using a tetrahydrofuran solvent, it was at 34,000. The content of silicon measured by an ashing method was at 15.6 wt % and the content of the diphenylsiloxane in the siloxane measured by $^{29}$Si-NMR was at 29 mol %.

Synthetic Example 4

35.8 g (0.1 mol) of DSDA and 400 g of NMP were charged into a flask equipped with an agitator, a thermometer and a nitrogen-purging device. Thereafter, a solution of 8.6 g (0.04 mols) of HAB and 65.3 g (0.06 mols) of PSI-A represented by the foregoing formula (18) dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (d).

The resin was subjected to measurement of infrared ray absorption spectra, revealing no appearance of the absorption based on an unreacted polyamic acid and confirming absorptions based on the imide group at $1,780 \text{ cm}^{-1}$ and $1,720 \text{ cm}^{-1}$. When the weight average molecular weight (in polystyrene conversion) was measured according to gel permeation chromatography (GPC) using a tetrahydrofuran solvent, it was at 33,000. The content of silicon measured by an ashing method was at 15.3 wt % and the content of the diphenylsiloxane in the siloxane measured by $^{29}$Si-NMR was at 20 mol %.

Synthetic Example 5

35.8 g (0.1 mol) of DSDA and 400 g of NMP were charged into a flask equipped with an agitator, a thermometer and a nitrogen-purging device. Thereafter, a solution of 6.5 g (0.03 mols) of HAB, 32.7 g (0.02 mols) of PSI-B represented by the foregoing formula (19) and 14.6 g (0.05 mols) of APB dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (e).

The resin was subjected to measurement of infrared ray absorption spectra, revealing no appearance of the absorption based on an unreacted polyamic acid and confirming absorptions based on the imide group at 1,780 cm$^{-1}$ and 1,720 cm$^{-1}$. When the weight average molecular weight (in polystyrene conversion) was measured according to gel permeation chromatography (GPC) using a tetrahydrofuran solvent, it was at 30,000. The content of silicon measured by an ashing method was at 8.8 wt % and the content of the diphenylsiloxane in the siloxane measured by $^{29}$Si-NMR was at 29 mol %.

Synthetic Example 6

52.1 g (0.1 mol) of BPADA and 400 g of NMP were charged into a flask equipped with an agitator, a thermometer and a nitrogen-purging device. Thereafter, a solution of 8.6 g (0.04 mols) of HAB and 98.0 g (0.06 mols) of PSI-B represented by the foregoing formula (19) dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (f).

The resin was subjected to measurement of infrared ray absorption spectra, revealing no appearance of the absorption based on an unreacted polyamic acid and confirming absorptions based on the imide group at 1,780 cm$^{-1}$ and 1,720 cm$^{-1}$. When the weight average molecular weight (in polystyrene conversion) was measured according to gel permeation chromatography (GPC) using a tetrahydrofuran solvent, it was at 34,000. The content of silicon measured by an ashing method was at 14.8 wt % and the content of the diphenylsiloxane in the siloxane measured by $^{29}$Si-NMR was at 29 mol %.

Synthetic Example 7

52.1 g (0.1 mol) of BPADA and 400 g of NMP were charged into a flask equipped with an agitator, a thermometer and a nitrogen-purging device. Thereafter, a solution of 11.0 g (0.03 mols) of 6FAP, 65.3 g (0.04 mols) of PSI-B represented by the foregoing formula (19) and 12.3 g of BAPP dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (g).

The resin was subjected to measurement of infrared ray absorption spectra, revealing no appearance of the absorption based on an unreacted polyamic acid and confirming absorptions based on the imide group at 1,780 cm$^{-1}$ and 1,720 cm$^{-1}$. When the weight average molecular weight (in polystyrene conversion) was measured according to gel permeation chromatography (GPC) using a tetrahydrofuran solvent, it was at 31,000. The content of silicon measured by an ashing method was at 11.1 wt % and the content of the diphenylsiloxane in the siloxane measured by $^{29}$Si-NMR was at 29 mol %.

Synthetic Example 8

44.4 g (0.1 mol) of 6FDA and 400 g of NMP were charged into a flask equipped with an agitator, a thermometer and a nitrogen-purging device. Thereafter, a solution of 16.4 g (0.04 mols) of BAPP and 53.3 g (0.06 mols) of PSI-C represented by the foregoing formula (20) dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (h).

The resin was subjected to measurement of infrared ray absorption spectra, revealing no appearance of the absorption based on an unreacted polyamic acid and confirming absorptions based on the imide group at 1,780 cm$^{-1}$ and 1,720 cm$^{-1}$. When the weight average molecular weight (in polystyrene conversion) was measured according to gel permeation chromatography (GPC) using a tetrahydrofuran solvent, it was at 34,000. The content of silicon measured by an ashing method was at 14.7 wt %.

Synthetic Example 9

44.4 g (0.1 mol) of 6FDA and 400 g of NMP were charged into a flask equipped with an agitator, a thermometer and a nitrogen-purging device. Thereafter, a solution of 8.6 g (0.04 mols) of HAB and 68.2 g (0.06 mols) of PSI-D represented by the foregoing formula (21) dissolved in 100 g of NMP was dropped in the flask while controlling the temperature of the reaction system at a level not exceeding 50° C. After completion of the dropping, the reaction system was agitated at room temperature for 10 hours. Next, a reflux condenser equipped with a water acceptor was attached to the flask, to which 30 g of xylene was added, followed by raising the temperature to 150° C. and keeping at the temperature for 6 hours, thereby obtaining a yellowish brown solution. The thus obtained solution was cooled down to room temperature (25° C.) and charged into methanol, followed by drying the resulting precipitate to obtain polyimide silicone resin (i).

The resin was subjected to measurement of infrared ray absorption spectra, revealing no appearance of the absorption based on an unreacted polyamic acid and confirming absorptions based on the imide group at 1,780 cm$^{-1}$ and 1,720 cm$^{-1}$. When the weight average molecular weight (in polystyrene conversion) was measured according to gel permeation chromatography (GPC) using a tetrahydrofuran solvent, it was at 34,000. The content of silicon measured by an ashing method was at 19.4 wt %.

EXAMPLES AND COMPARATIVE EXAMPLES

Examples 1 to 8 and Comparative Examples 1 to 9 are now described. The results of evaluation of physical properties are summarized in Tables 2 and 3.

Example 1

32.2 g of the polyimide silicone resin (a) prepared in Synthetic Example 1, 188.0 g of EP-A, 135.0 g of PH-A and 3.2 g of IMZ were uniformly mixed to obtain a liquid composition having a viscosity of 80 Pa-second at 25° C. The composition was so dropped over a copper plate that an adhesion face had a circle of 5 mm in diameter and a height of about 2 mm, followed by thermal treatment under conditions of 180° C./5 hours, thereby providing adhesion test samples. As an adhesion test, a scratch test using a bond tester, made by Dage Arctek Co., Ltd., was carried out to measure peeling force. The average of five measurements was at 450 N. Other test samples were allowed to stand at 150° C. for 1000 hours (heat resistance test), at 80° C./85% R.H. for 1000 hours (high temperature and high humidity test), and in saturated steam at 2.1 atm., for 168 hours (PCT test), and subjected to measurement of peeling force, with the results of 500 N, 430 N and 180 N, respectively.

Example 2

80.5 g of the polyimide silicone resin (a) prepared in Synthetic Example 1, 188.0 g of EP-A, 135.0 g of PH-A and 3.2 g of IMZ were uniformly mixed to obtain a liquid composition having a viscosity of 900 Pa-second at 25° C. In the same manner as in Example 1, the composition was subjected to measurement of peeling force and other test samples were likewise subjected to heat resistance test, high temperature and high humidity test and PCT test, followed by measurement of peeling force, with the results of 600 N, 620 N, 550 N and 200 N, respectively.

Example 3

80.5 g of the polyimide silicone resin (b) prepared in Synthetic Example 2, 188.0 g of EP-A, 135.0 g of PH-A and 3.2 g of IMZ were uniformly mixed to obtain a liquid composition having a viscosity of 700 Pa-second at 25° C. In the same manner as in Example 1, the composition was subjected to measurement of peeling force and other test samples were likewise subjected to heat resistance test, high temperature and high humidity test and PCT test, followed by measurement of peeling force, with the results of 650 N, 650 N, 610 N and 250 N, respectively.

Example 4

48.3 g of the polyimide silicone resin (c) prepared in Synthetic Example 3, 188.0 g of EP-A, 135.0 g of PH-A and 3.2 g of IMZ were uniformly mixed to obtain a liquid composition having a viscosity of 170 Pa-second at 25° C. The composition was so dropped over a copper plate that an adhesion face had a circle of 5 mm in diameter and a height of about 2 mm, followed by thermal treatment under conditions of 180° C./5 hours, thereby providing adhesion test samples. Some test samples were subjected to measurement of peeling force in the same manner as in Example 1 and other samples were further subjected to heat resistance test, high temperature and high humidity test and PCT test, followed by measurement of peeling force in a similar way, with the results of 400 N, 390 N, 340 N and 170 N, respectively.

Example 5

150.4 g of EP-A and 39.8 g of EP-B were mixed to obtain a liquid epoxy composition having a viscosity of 40 Pa-second at 25° C., followed by uniform mixing of 32.5 g of the polyimide silicone resin (d) prepared in Synthetic Example 4, 135.0 g of PH-A and 3.2 g of IMZ therewith, thereby obtaining a liquid composition having a viscosity of 300 Pa-second at 25° C. The composition was so dropped over a copper plate that an adhesion face had a circle of 5 mm in diameter and a height of about 2 mm, followed by thermal treatment under conditions of 180° C./5 hours, thereby providing adhesion test samples. Some test samples were subjected to measurement of peeling force in the same manner as in Example 1, and other samples were subjected to a heat resistance test, high temperature and high humidity test and PCT test, followed by measurement of peeling force in a similar way, with the results of 400 N, 430 N, 310 N and 150 N, respectively.

Example 6

32.2 g of the polyimide silicone resin(e) prepared in Synthetic Example 5, 188.0 of EP-A, 135.0 g of PH-A, 3.2 g of IMZ were mixed uniformly to obtain a liquid composition having a viscosity of 800 Pa-second at 25° C. The composition was so dropped over a copper plate that an adhesion face had a circle of 5 mm in diameter and a height of about 2 mm, followed by thermal treatment under conditions of 180° C./5 hours, thereby providing adhesion test samples. Some test samples were subjected to measurement of peeling force in the same manner as in Example 1, and other samples were subjected to a heat resistance test, high temperature and high humidity test and PCT test, followed by measurement of peeling force in a similar way, with the results of 300 N, 320 N, 290 N and 120 N, respectively.

Example 7

150.4 g of EP-A and 46.0 g of EP-C were mixed to obtain a liquid epoxy composition having a viscosity of 160 Pa-second at 25° C., followed by uniform mixing of 33.1 g of the polyimide silicone resin (f) prepared in Synthetic Example 6, 135.0 g of PH-A and 3.3 g of IMZ therewith, thereby obtaining a liquid composition having a viscosity of 2500 Pa-second at 25° C. The composition was so dropped over a copper plate that an adhesion face had a circle of 5 mm in diameter and a height of about 2 mm, followed by thermal treatment under conditions of 180° C./5 hours, thereby providing adhesion test samples. Some test samples were subjected to measurement of peeling force in the same manner as in Example 1, and other samples were subjected to a heat resistance test, high temperature and high humidity test and PCT test, followed by measurement of peeling force in a similar way, with the results of 450 N, 480 N, 420 N and 170 N, respectively.

Example 8

121.5 g of PH-A and 10.5 g of PH-B were mixed to obtain a liquid phenol resin composition having a viscosity of 19 Pa-second at 25° C., followed by uniform mixing of 32.0 g of the polyimide silicone resin (g) prepared in Synthetic Example 7, 188.0 g of EP-A and 3.2 g of IMZ therewith, thereby obtaining a liquid composition having a viscosity of 280 Pa-second at 25° C. The composition was so dropped over a copper plate that an adhesion face had a circle of 5 mm in diameter and a height of about 2 mm, followed by thermal treatment under conditions of 180° C./5 hours, thereby providing adhesion test samples. Some test samples were subjected to measurement of peeling force in the same manner as in Example 1, and other samples were subjected to a heat resistance test, high temperature and high humidity test and PCT test, followed by measurement of peeling force in a similar way, with the results of 400 N, 400 N, 380 N and 130 N, respectively.

Comparative Example 1

188.0 g of EP-A, 135.0 g of PH-A and 3.2 g of IMZ were uniformly mixed to obtain a liquid composition having a viscosity of 10 Pa-second at 25° C. The composition was so dropped over a copper plate that an adhesion face had a circle of 5 mm in diameter and a height of about 2 mm, followed by thermal treatment under conditions of 180° C./5 hours, thereby providing adhesion test samples. Some test samples were subjected to measurement of peeling force in the same manner as in Example 1, and other samples were subjected to a heat resistance test, high temperature and high humidity test and PCT test, followed by measurement of peeling force in a similar way, with the results of 50 N, 70 N, 45 N and 10 N, respectively.

Comparative Example 2

161.5 g of the polyimide silicone resin (a) prepared in Synthetic Example 1, 188.0 g of EP-A, 135.0 g of PH-A and 3.2 g of IMZ were uniformly mixed, whereupon fluidity was lost. More particularly, the composition has no ability of adhesion.

Comparative Example 3

30.4 g of the polyimide silicone resin (a) prepared in Synthetic Example 1, 199.0 g of EP-B, 105.0 g of PH-B and 3.0 g of IMZ were uniformly mixed, whereupon fluidity was lost. More particularly, the composition has no ability of adhesion.

Comparative Example 4

30.4 g of the polyimide silicone resin (b) prepared in Synthetic Example 2, 199.0 g of EP-B, 105.0 g of PH-B and 3.0 g of IMZ were uniformly mixed, whereupon fluidity was lost. More particularly, the composition has no ability of adhesion.

Comparative Example 5

33.5 g of the polyimide silicone resin (c) prepared in Synthetic Example 3, 230.0 g of EP-C, 105.0 g of PH-B and 3.3 g of IMZ were uniformly mixed, whereupon fluidity was lost. More particularly, the composition has no ability of adhesion.

Comparative Example 6

29.3 g of the polyimide silicone resin (e) prepared in Synthetic Example 5, 188.0 g of EP-A, 105.0 g of PH-B and 2.9 g of IMZ were uniformly mixed, whereupon fluidity was lost. More particularly, the composition has no ability of adhesion.

Comparative Example 7

33.4 g of the polyimide silicone resin (g) prepared in Synthetic Example 7, 199.0 g of EP-B, 135.0 g of PH-A and 3.3 g of IMZ were uniformly mixed, whereupon fluidity was lost. More particularly, the composition has no ability of adhesion.

Comparative Example 8

20.0 g of the polyimide silicone resin (h) prepared in Synthetic Example 8, 80.0 g of EA and 35.0 g of D117 were uniformly mixed, thereby obtaining a liquid composition having a viscosity of 9 Pa-second at 25° C. The composition was subjected to ultraviolet irradiation (accumulated light quantity: 1,000 mJ/m$^2$) by use of a high pressure mercury lamp, thereby providing adhesion test samples. Some samples were subjected to measurement of peeling force in the same manner as in Example 1 and was found to be at 120 N. Other test samples were allowed to stand under conditions of 150° C. for 1,000 hours, under conditions of 80° C./85% RH for 1,000 hours and also in saturated vapor steam of 2.1 atms., for 168 hours and subjected to measurement of peeling force in a similar way, with the results of 20 N, 80 N and 0 N, respectively.

Comparative Example 9

It was attempted to uniformly mix 32.2 g of the polyimide silicone resin (i) prepared in Synthetic Example 9, 188.0 g of EP-A, 135.0 g of PH-A and 3.2 g of IMZ, but in vain. That is, the composition has no ability of adhesion.

As stated hereinabove, with Examples 1 to 8, it has been confirmed that individual ingredients are satisfactorily miscible with one another without use of a solvent and exhibit good fluidity, along with good adhesion reliability.

On the other hand, with Comparative Examples 1 to 9, it has been confirmed that miscibility of individual ingredients is not good, especially, with Comparative Examples 2 to 7 and 9, no fluidity is shown with no ability of adhesion.

TABLE 1

| Formulation amount (molar ratio) | | Polyimide silicone resin | | | | | | | | |
|---|---|---|---|---|---|---|---|---|---|---|
| | | a | b | c | d | e | f | g | h | i |
| Acid dianhydride | 6FDA | 1.0 | 1.0 | 1.0 | | | | | 1.0 | 1.0 |
| | DSDA | | | | 1.0 | 1.0 | | | | |
| | BPADA | | | | | | 1.0 | 1.0 | | |
| Phenolic hydroxyl group-containing diamine compound | HAB | 0.4 | 0.2 | 0.4 | 0.4 | 0.3 | 0.4 | | | 0.4 |
| | 6FAP | | | | | | | 0.3 | | |
| Diaminosiloxane compound | PSI-A | 0.6 | 0.6 | | 0.6 | | | | | |
| | PSI-B | | | 0.6 | | 0.2 | 0.6 | 0.4 | | |
| | PSI-C | | | | | | | | 0.6 | |
| | PSI-D | | | | | | | | | 0.6 |
| Diamine compound | BAPP | | 0.2 | | | | | 0.3 | 0.4 | |
| | APB | | | | | 0.5 | | | | |
| Results of analyses | Average molecular weight (MW) | 33,000 | 35,000 | 34,000 | 33,000 | 30,000 | 34,000 | 31,000 | 34,000 | 34,000 |
| | Content of silicon (wt %) | 14.2 | 13.7 | 15.6 | 15.3 | 8.8 | 14.8 | 11.1 | 14.7 | 19.4 |
| | Content of diphenylsiloxane (mol %) | 20 | 20 | 29 | 20 | 29 | 29 | 29 | 0 | 0 |

TABLE 2

| Formulation amount (g) | | Example | | | | | | | |
|---|---|---|---|---|---|---|---|---|---|
| | | 1 | 2 | 3 | 4 | 5 | 6 | 7 | 8 |
| (A) Polyimide Silicone resin | a | 32.2 | 80.5 | | | | | | |
| | b | | | 80.5 | | | | | |
| | c | | | | 48.3 | | | | |
| | d | | | | | 32.5 | | | |
| | e | | | | | | 32.5 | | |
| | f | | | | | | | 33.1 | |
| | g | | | | | | | | 32.0 |
| | h | | | | | | | | |
| | i | | | | | | | | |
| (B) Epoxy resin | EP-A | 188.0 | 188.0 | 188.0 | 188.0 | 150.0 | 188.0 | 150.4 | 188.0 |
| | EP-B | | | | | 39.8 | | | |
| | EP-C | | | | | | | 46.0 | |
| (C) Phenol resin | PH-A | 135.0 | 135.0 | 135.0 | 135.0 | 135.0 | 135.0 | 135.0 | 121.5 |
| | PH-B | | | | | | | | 10.5 |
| (D) Other resin | EA | | | | | | | | |
| Content of polyimide silicone resin (%) | | 9 | 20 | 20 | 13 | 9 | 9 | 10 | 9 |
| Results of evaluation | Viscosity (Pa-second) | 80 | 900 | 700 | 170 | 300 | 800 | 2500 | 280 |
| | Adhesiveness (N)* Initial | 450 | 600 | 650 | 400 | 400 | 300 | 450 | 400 |
| | Heat resistance | 500 | 620 | 650 | 390 | 430 | 320 | 480 | 400 |
| | High tenperature/high humidity | 430 | 550 | 610 | 340 | 310 | 290 | 420 | 380 |
| | PCT | 180 | 200 | 250 | 170 | 150 | 120 | 170 | 130 |

*The peeling force was measured according to the scratching test.

TABLE 3

| Formulation amount (g) | | Comparative Example | | | | | | | | |
|---|---|---|---|---|---|---|---|---|---|---|
| | | 1 | 2 | 3 | 4 | 5 | 6 | 7 | 8 | 9 |
| (A) Polyimide Silicone resin | a | | 161.5 | 30.4 | | | | | | |
| | b | | | | 30.4 | | | | | |
| | c | | | | | 33.5 | | | | |
| | d | | | | | | | | | |
| | e | | | | | | 29.5 | | | |
| | f | | | | | | | | | |
| | g | | | | | | | 33.4 | | |
| | h | | | | | | | | 20.0 | |
| | i | | | | | | | | | 32.2 |
| (B) Epoxy resin | EP-A | 188.0 | 188.0 | | | | 188.0 | | | |
| | EP-B | | | 199.0 | 199.0 | | | 199.0 | | |
| | EP-C | | | | | 230.0 | | | | |
| (C) Phenol resin | PH-A | 135.0 | 135.0 | | | | | 135.0 | | 135.0 |
| | PH-B | | | 105.0 | 105.0 | 105.0 | 105.0 | | | |
| (D) Other resin | EA | | | | | | | | 80.0 | |
| Content of polyimide silicone resin (%) | | 0 | 33 | 9 | 9 | 9 | 9 | 9 | 100 | 19 |
| Results of evaluation | Viscosity (Pa-second) | 10 | Non-fluid | Non-fluid | Non-fluid | Non-fluid | Non-fluid | Non-fluid | 9 | Not miscible |
| | Adhesiveness (N)* Initial | 50 | | | | | | | 120 | |
| | Heat resistance | 70 | | | | | | | 20 | |
| | High temperature/high humidity | 45 | | | | | | | 80 | |
| | PCT | 10 | | | | | | | 0 | |

*The peeling force was measured according to the scratching test.

The present invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

Japanese Patent Application No. 2008-218318 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A solvent-free polyimide silicone resin composition, which comprises:
   (A) a polyimide silicone resin having recurring units represented by the following formula (1) and a weight average molecular weight of 5,000 to 150,000:

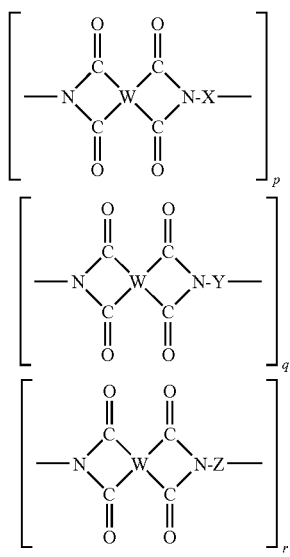

(1)

wherein
   W represents a tetravalent organic group,
   X represents a divalent group having a phenolic hydroxyl group,
   Y represents a divalent silicone residue represented by the following formula (2)

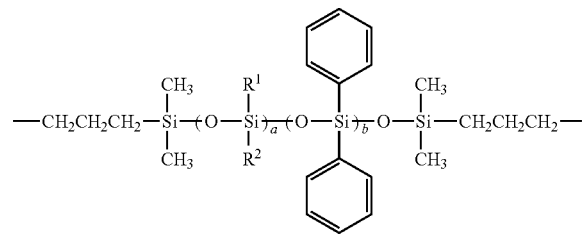

(2)

wherein $R^1$ and $R^2$ may be the same or different and represent an alkyl group having 1 to 6 carbon atoms, and a and b are, respectively, an integer of 1 to 20 provided that $1 \leq a+b \leq 20$ and $0.1 \leq b/(a+b+2) \leq 0.5$, and Z represents a divalent organic group other than X and Y, and p, q and r are such that $0.15 \leq p \leq 0.6$, $0.05 \leq q \leq 0.8$ and $0 \leq r \leq 0.75$ are respectively satisfied provided that the total of p, q and r is at 1;
   (B) an epoxy resin comprising a liquid epoxy resin and a solid epoxy resin in a weight ratio of 100:0 to 100:100; and
   (C) an epoxy resin curing agent, the resin composition having a fluidity at 25° C. and being free of a solvent,
   wherein a content of said polyimide silicone resin (A) relative to the total of said polyimide silicone resin, said epoxy resin (B), and said epoxy resin curing agent (C) ranges from 1 to 20 wt %, and
   wherein said solvent-free polyimide silicone resin composition has a viscosity of not greater than 10,000 Pa·second at 25° C.

2. The solvent-free polyimide silicone resin composition according to claim 1, wherein said epoxy resin curing agent (C) comprises as a main component a liquid acid anhydride, a liquid amine compound or a liquid phenol resin.

3. The solvent-free polyimide silicone resin composition according to claim 1, wherein X in the formula (1) is a divalent group having a phenolic hydroxyl group and represented by any of the following formulas (3) to (8)

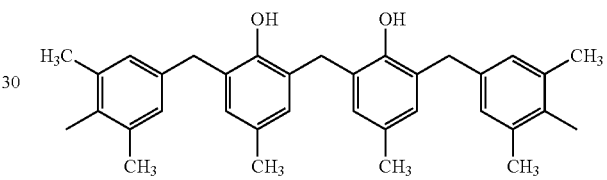

(3)

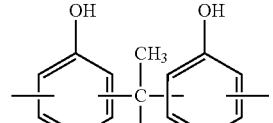

(4)

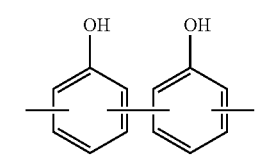

(5)

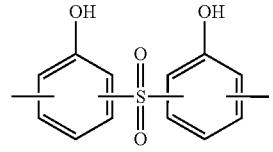

(6)

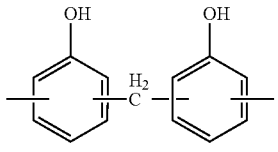

(7)

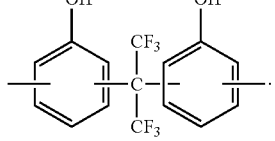

(8)

4. A cured product of a solvent-free polyimide silicon resin composition which comprises:
(A) a polyimide silicone resin having recurring units represented by the following formula (1) and a weight average molecular weight of 5,000 to 150,000:

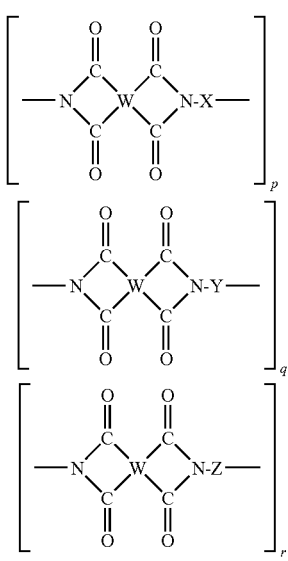

wherein W represents a tetravalent organic group, X represents a divalent group having a phenolic hydroxyl group, Y represents a divalent silicone residue represented by the following formula (2), Z represents a divalent organic group other than X and Y, and p, q and r are such that $0.15 \leq p \leq 0.6$, $0.05 \leq q \leq 0.8$ and $0 \leq r \leq 0.75$ are respectively satisfied provided that the total of p, q and r is at 1

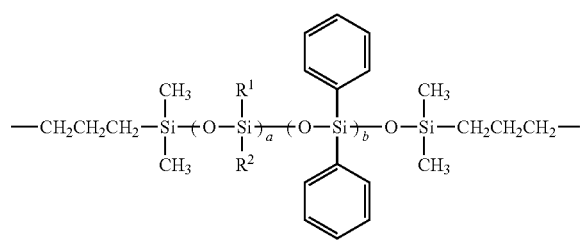

wherein $R^1$ and $R^2$ may be the same or different and represent an alkyl group having 1 to 6 carbon atoms, and a and b are, respectively, an integer of 1 to 20 provided that $1 \leq a+b \leq 20$ and $0.1 \leq b/(a+b+2) \leq 0.5$;
(B) an epoxy resin comprising a liquid epoxy resin and a solid epoxy resin in a weight ratio of 100:0 to 100:100; and
(C) an epoxy resin curing agent, the resin composition having a fluidity at 25° C. and being free of a solvent, wherein a content of said polyimide silicone resin (A) relative to the total of said polyimide silicone resin, said epoxy resin (B), and said epoxy resin curing agent (C) ranges from 1 to 20 wt %, and
wherein said solvent-free polyimide silicone resin composition has a viscosity of not greater than 10,000 Pa·second at 25° C.

5. A protective film or an insulating film for electric or electronic parts, wherein said protective film or insulating film is obtained by heating and curing a solvent-free polyimide silicon resin composition which comprises:
(A) a polyimide silicone resin having recurring units represented by the following formula (1) and a weight average molecular weight of 5,000 to 150,000:

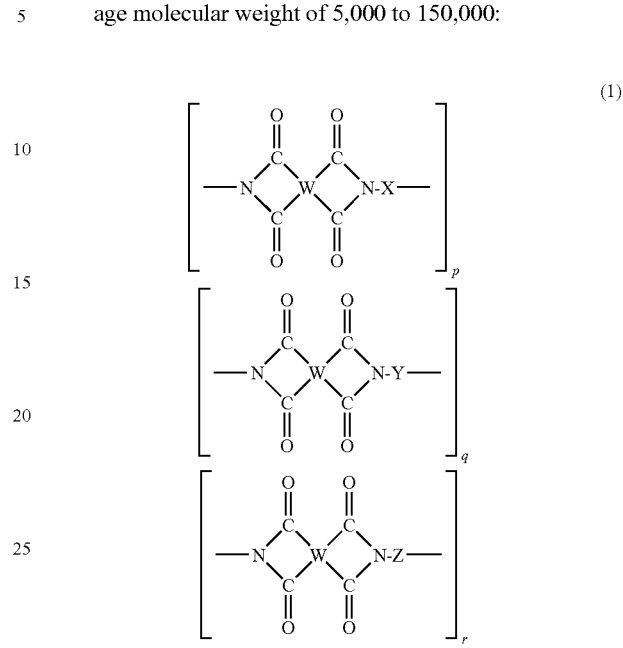

wherein W represents a tetravalent organic group, X represents a divalent group having a phenolic hydroxyl group, Y represents a divalent silicone residue represented by the following formula (2), Z represents a divalent organic group other than X and Y, and p, q and r are such that $0.15 \leq p \leq 0.6$, $0.05 \leq q \leq 0.8$ and $0 \leq r \leq 0.75$ are respectively satisfied provided that the total of p, q and r is at 1

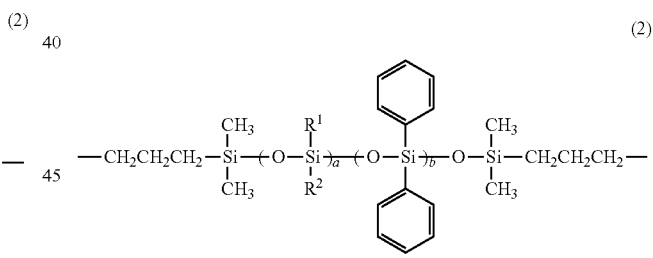

wherein $R^1$ and $R^2$ may be the same or different and represent an alkyl group having 1 to 6 carbon atoms, and a and b are, respectively, an integer of 1 to 20 provided that $1 \leq a+b \leq 20$ and $0.1 \leq b/(a+b+2) \leq 0.5$;
(B) an epoxy resin comprising a liquid epoxy resin and a solid epoxy resin in a weight ratio of 100:0 to 100:100; and
(C) an epoxy resin curing agent, the resin composition having a fluidity at 25° C. and being free of a solvent, wherein a content of said polyimide silicone resin (A) relative to the total of said polyimide silicone resin, said epoxy resin (B), and said epoxy resin curing agent (C) ranges from 1 to 20 wt %, and
wherein said solvent-free polyimide silicone resin composition has a viscosity of not greater than 10,000 Pa·second at 25° C.

6. The solvent-free polyimide silicone resin composition according to claim 1, wherein W in formula (1) is selected from the group consisting of pyromellitic dianhydride, 2,3, 3',4'-biphenyltetracarboxylic dianhydride, 3,3',4,4'-biphenyltetracarboxylic dianhydride, 3,3',4,4'-diphenyl ether tetracarboxylic dianhydride, 3,3',4,4'-diphenyl sulfone tetracarboxylic dianhydride, 3,3',4,4'-dibenzophenonetetracarboxylic dianhydride, ethylene glycol bistrimellitic dianhydride, 3,3',4,4'-diphenyl ether tetracarboxylic dianhydride, 4,4'-hexafluoropropylidene bisphthalic dianhydride, and 2,2-bis[4-(3,4-phenoxydicarboxylc acid)phenyl]propanoic dianhydride.

7. The solvent-free polyimide silicone resin composition according to claim 6, wherein W in formula (1) is selected from the group consisting of 3,3',4,4'-diphenyl sulfone tetracarboxylic dianhydride, 4,4'-hexafluoropropylidene bisphthalic dianhydride, and 2,2-bis[4-(3,4-phenoxydicarboxylc acid)phenyl]propanoic dianhydride.

8. The solvent-free polyimide silicone resin composition according to claim 1, wherein Z in formula (1) is an aromatic diamine represented by the following formula (14) and wherein B selected from the group consisting of the group of the following formulas (15), (16), and (17):

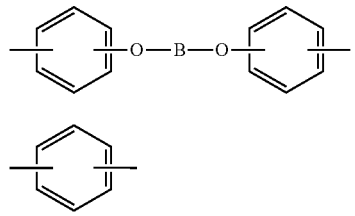

9. The solvent-free polyimide silicone resin composition according to claim 1, wherein component (B) is a liquid epoxy resin.

10. The solvent-free polyimide silicone resin composition according to claim 1, wherein component (B) comprises 5 to 100 parts by weight of solid epoxy resin per 100 parts by weight of liquid epoxy resin.

11. The solvent-free polyimide silicone resin composition according to claim 1, wherein component (C) is an acid anhydride compound, an aliphatic amine, an alicyclic amine, an aromatic amine, an aminobenzoic acid ester, a polyaminoamide resin, or a phenolic resin.

12. The solvent-free polyimide silicone resin composition according to claim 1, formulated with a tertiary amine or imidazole compound epoxy resin curing catalyst.

* * * * *